United States Patent
Nishimura

(10) Patent No.: US 10,309,511 B2
(45) Date of Patent: Jun. 4, 2019

(54) SUPPORT STRUCTURE FOR ROTATING MEMBER

(71) Applicant: MUSASHI SEIMITSU INDUSTRY CO., LTD., Toyohashi-shi, Aichi (JP)

(72) Inventor: Naoya Nishimura, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 58 days.

(21) Appl. No.: 15/586,639

(22) Filed: May 4, 2017

(65) Prior Publication Data

US 2017/0328459 A1    Nov. 16, 2017

(30) Foreign Application Priority Data

May 16, 2016   (JP) .................................. 2016-098173

(51) Int. Cl.
*F16H 48/08*   (2006.01)
*F16C 17/04*   (2006.01)
(Continued)

(52) U.S. Cl.
CPC ............. *F16H 48/08* (2013.01); *F16C 17/04* (2013.01); *F16C 23/048* (2013.01);
(Continued)

(58) Field of Classification Search
CPC .... F16H 48/08; F16H 48/40; F16H 2048/087; F16C 17/04; F16C 23/048; F16C 33/103; F16C 2361/61
(Continued)

(56) References Cited

U.S. PATENT DOCUMENTS

| 7,207,110 B2* | 4/2007 | Pascoe | F16H 48/08 29/893.2 |
|---|---|---|---|
| 8,591,373 B2* | 11/2013 | Shibagaki | F16H 48/08 475/230 |
| 2018/0245677 A1* | 8/2018 | Yoshisaka | F16H 48/08 |

FOREIGN PATENT DOCUMENTS

| CN | 202451744 U | 9/2012 | |
|---|---|---|---|
| DE | 102014000499 A1 * | 7/2015 | ............. F16H 48/40 |

(Continued)

OTHER PUBLICATIONS

European Patent Office Patent Translate machine translation of DE102014000499A1; http://translationportal.epo.org/emtp/translate/?ACTION=description-retrieval&COUNTRY=DE&ENGINE=google&FORMAT=docdb&KIND=A1&LOCALE=en_EP&NUMBER=102014000499&OPS=ops.epo.org/3.2&SRCLANG=de&TRGLANG=en (Year: 2018).*

(Continued)

*Primary Examiner* — Leslie A Nicholson, III
(74) *Attorney, Agent, or Firm* — Carrier Blackman & Associates, P.C.; Joseph P. Carrier; Anne G. Sabourin

(57) ABSTRACT

In a support structure for a rotating member, in which a support body supporting a rotating member so as to be rotatable around a predetermined axis is provided with a spherical support face that is recessed toward a side opposite to the rotating member, and a back face of the rotating member is rotatably and slidably supported on the support face, the back face of the rotating member is formed as a convexly curved face that is curved so that portions on opposite sides of the axis each protrude toward the support face when viewed in a cross section containing an entirety of the axis. In order for the back face to be supported on the support face via an apex portion of the convexly curved face, a radius of curvature of at least the apex portion is set smaller than a radius of curvature of the support face.

10 Claims, 4 Drawing Sheets

(51) Int. Cl.
  *F16H 48/40* (2012.01)
  *F16C 23/04* (2006.01)
  *F16C 33/10* (2006.01)

(52) U.S. Cl.
  CPC ........... *F16C 33/103* (2013.01); *F16H 48/40* (2013.01); *F16C 2361/61* (2013.01); *F16H 2048/087* (2013.01)

(58) Field of Classification Search
  USPC ................................ 475/220, 230; 74/606 R
  See application file for complete search history.

(56) References Cited

FOREIGN PATENT DOCUMENTS

| | | |
|---|---|---|
| JP | 57-143436 U | 3/1956 |
| JP | S58-178014 A | 10/1983 |
| JP | 53-69850 U | 5/1988 |
| JP | 105-330354 A | 12/1993 |
| JP | 2001146952 A * | 5/2001 |

OTHER PUBLICATIONS

Official Communication dated Feb. 27, 2019 issued in the corresponding Japanese patent application No. 2016-098173 with the English translation thereof.

* cited by examiner

WHEN THRUST LOAD IS SMALL

WHEN THRUST LOAD IS LARGE

SUPPORT STRUCTURE FOR ROTATING MEMBER

BACKGROUND OF THE INVENTION

Field of the Invention

The present invention relates to a support structure for a rotating member, a back face of the rotating member being rotatably and slidably supported on a support face of a support body.

Description of the Related Art

As the support structure, a mechanical device such as a differential device and the like is conventionally known in which a back face formed from a convex spherical surface of a rotating member (e.g. a bevel gear) opposes a support face formed from a concave spherical surface of a support body (e.g. a differential case) so that they can come into sliding contact.

In this conventional structure, since the support face of the support body and the back face of the rotating member are formed into spherical shapes having the same radius of curvature, there is the problem that a sufficient gap as a space for retaining lubricating oil cannot be ensured between the contact faces of the two.

In order to solve the above problem, Japanese Patent Application Laid-open No. 58-178014 discloses an arrangement in which disposed between a support face of a differential case (support body) and a back face of a pinion gear (rotating member) having the same radius of curvature as each other is a plate-shaped thrust washer curved into a spherical shape at a larger radius of curvature than the above radius of curvature. In Japanese Patent Application Laid-open No. 58-178014, an appropriate gap (that is, oil retaining space) is ensured between an outside face of the thrust washer and the support face of the differential case and between an inside face of the thrust washer and the back face of the pinion gear, with the aim of suppressing wear of the differential case, etc.

However, in the arrangement of Japanese Patent Application Laid-open No. 58-178014, when the thrust washer is subjected to a large thrust load and undergoes elastic deformation, the outside face and the inside face of the thrust washer can come into intimate contact with the support face of the differential case and the back face of the pinion gear respectively over their entire faces. In this case, the gap is lost, sufficient lubricating oil cannot be retained there, and the lubrication performance is degraded. This causes an increase in the rotational sliding resistance that the pinion gear is subjected to from the differential case when rotating, thus giving rise to problems such as lowering of the transmission efficiency of a transmission.

SUMMARY OF THE INVENTION

The present invention has been accomplished in light of such circumstances, and it is an object thereof to provide a support structure for a rotating member that can solve the problems of the conventional structure with a simple structure.

In order to achieve the object, according to a first aspect of the present invention, there is provided a support structure for a rotating member, in which a support body supporting a rotating member so as to be rotatable around a predetermined axis is provided with a spherical support face that is recessed toward a side opposite to the rotating member, and a back face of the rotating member is rotatably and slidably supported on the support face, wherein the back face of the rotating member is formed as a convexly curved face that is curved so that portions on opposite sides of the predetermined axis each protrude toward the support face when viewed in a cross section containing an entirety of the predetermined axis, and in order for the back face to be supported on the support face via an apex portion of the convexly curved face, a radius of curvature of at least the apex portion is set smaller than a radius of curvature of the support face when viewed in the cross section.

In accordance with the first aspect of the present invention, since the back face of the rotating member is formed as a convexly curved face that is curved so that portions on opposite sides of the predetermined axis, which is the rotational axis of the rotating member, each protrude toward the support face when viewed in the cross section containing the entirety of the predetermined axis, and in order for the back face to be supported on the support face via the apex portion of the convexly curved face, the radius of curvature of at least the apex portion is set smaller than the radius of curvature of the support face when viewed in the cross section, the region of contact between the support face and the back face of the rotating member is restricted to the part where the apex part and the support face are in contact, thus enabling an oil retaining space to be ensured over a wide range between opposing faces of the support face and the back face of the rotating member around the part where the apex part and the support face are in contact and thereby enabling sufficient lubricating oil to be retained. This reduces the rotational sliding resistance that the rotating member is subjected to from the support face with a simple structure in which the back face of the rotating member is merely made as the convexly curved face, thereby enhancing the transmission efficiency while reducing the cost.

According to a second aspect of the present invention, in addition to the first aspect, the apex portion is disposed offset further toward the predetermined axis than a midpoint of the convexly curved face in a radial direction of the predetermined axis when viewed in the cross section.

In accordance with the second aspect, since the apex portion is disposed offset further toward the predetermined axis than the midpoint of the convexly curved face in the radial direction of the predetermined axis when viewed in the cross section, the distance from the rotational center (predetermined axis) of the rotating member to the part where the apex part and the support face are in contact can be shortened, the peripheral speed of the contact part when the rotating member is rotating can be reduced, and this enables wear of the contact part to be suppressed effectively.

According to a third aspect of the present invention, in addition to the first or second aspect, a thrust washer having an outside face with a spherical shape that is convex toward the support face side is disposed between the support face and the back face, and the outside face of the thrust washer is formed so as to have a radius of curvature that is larger than the radius of curvature of the support face when viewed in the cross section.

In accordance with the third aspect, since the thrust washer having the outside face with a spherical shape that is convex toward the support face side is disposed between the support face and the back face of the rotating member, and the outside face is formed so as to have a radius of curvature that is larger than the radius of curvature of the support face when viewed in the cross section, when the thrust load of the rotating member is relatively small, the outer peripheral part of the outside face of the thrust washer is in intimate contact with the support face, whereas a relatively large gap is formed between the inner peripheral part of the outside face and the support face, and due to the inside face of the thrust washer making contact with the apex part of the back face of the rotating member, a considerable gap is also formed between the outer peripheral part and the inner peripheral part respectively of the inside face of the thrust washer and the back face of the rotating member. Therefore, since lubricating oil can be retained sufficiently in these three gaps, the lubricating effect enables the rotational sliding resistance that the rotating member is subjected to from the support face via the thrust washer to be reduced. Furthermore, when the thrust washer is pushed strongly against the apex part of the rotating member due to an increase in the thrust load of the rotating member and is elastically deformed, although the gap between the support face and the inner peripheral part of the outside face of the thrust washer is reduced a little, the three gaps are still ensured, lubricating oil can be continuously retained by each of the gaps, and the lubricating effect can be maintained. Furthermore, since a situation in which galling is caused by an inner peripheral edge of the thrust washer biting into the support face or the back face or an outer peripheral edge biting into the back face can be avoided effectively, it is possible to contribute to suppression of wear of the support face and the back face of the rotating member and consequently improvement of durability.

According to a fourth aspect of the present invention, in addition to the third aspect, the thrust washer has a through hole on a side that is further from the predetermined axis than a site at which an inside face of the thrust washer contacts the apex portion.

In accordance with the fourth aspect, since the thrust washer has the through hole on the side that is further from the predetermined axis than the site where the thrust washer makes contact with the apex part of the back face of the rotating member, even if due to an increase in the thrust load of the rotating member the thrust washer is pushed strongly by the apex part of the rotating member, and the outer peripheral part of the outside face of the thrust washer comes into intimate contact with the support face, it is possible to efficiently supply lubricating oil to the intimate contact part through the through hole in the outer peripheral part of the inside face of the thrust washer, thus keeping the intimate contact part in a well lubricated state.

According to a fifth aspect of the present invention, in addition to any one of the first to fourth aspects, the support body is a differential case, and the rotating member is at least one bevel gear among a pair of first bevel gears that are supported so as to be rotatable around a rotational axis of the differential case and a second bevel gear that is present between the pair of first bevel gears, meshes with the pair of first bevel gears, and is supported on the differential case so as to be rotatable around a predetermined axis orthogonal to the rotational axis.

In accordance with the fifth aspect, since the support body is the differential case, and the rotating member is at least one bevel gear among the pair of first bevel gears rotatably supported on the differential case and the second bevel gear meshing with the two first bevel gears and rotatably supported on the differential case, it is possible to reduce effectively the rotational sliding resistance that the bevel gear is subjected to from the support face of the differential case, thus enhancing the transmission efficiency of the differential device.

In the present invention, a 'spherical shape' includes a truly spherical surface as well as a spherical body that is close to a true sphere, such as, for example, an ellipsoid, an ovaloid, or the like.

Furthermore, in the present invention, an 'apex part' includes not only the apex but also a predetermined region, in the vicinity of the apex, having a fixed radius of curvature.

Moreover, in the present invention, a 'cross section containing an entire predetermined axis' is a cross section in which the entire predetermined axis is present in the cross section and therefore does not include a cross section that contains part of the predetermined axis (that is, one that intersects the predetermined axis).

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention are explained below by reference to the attached drawings.

Figure 1:
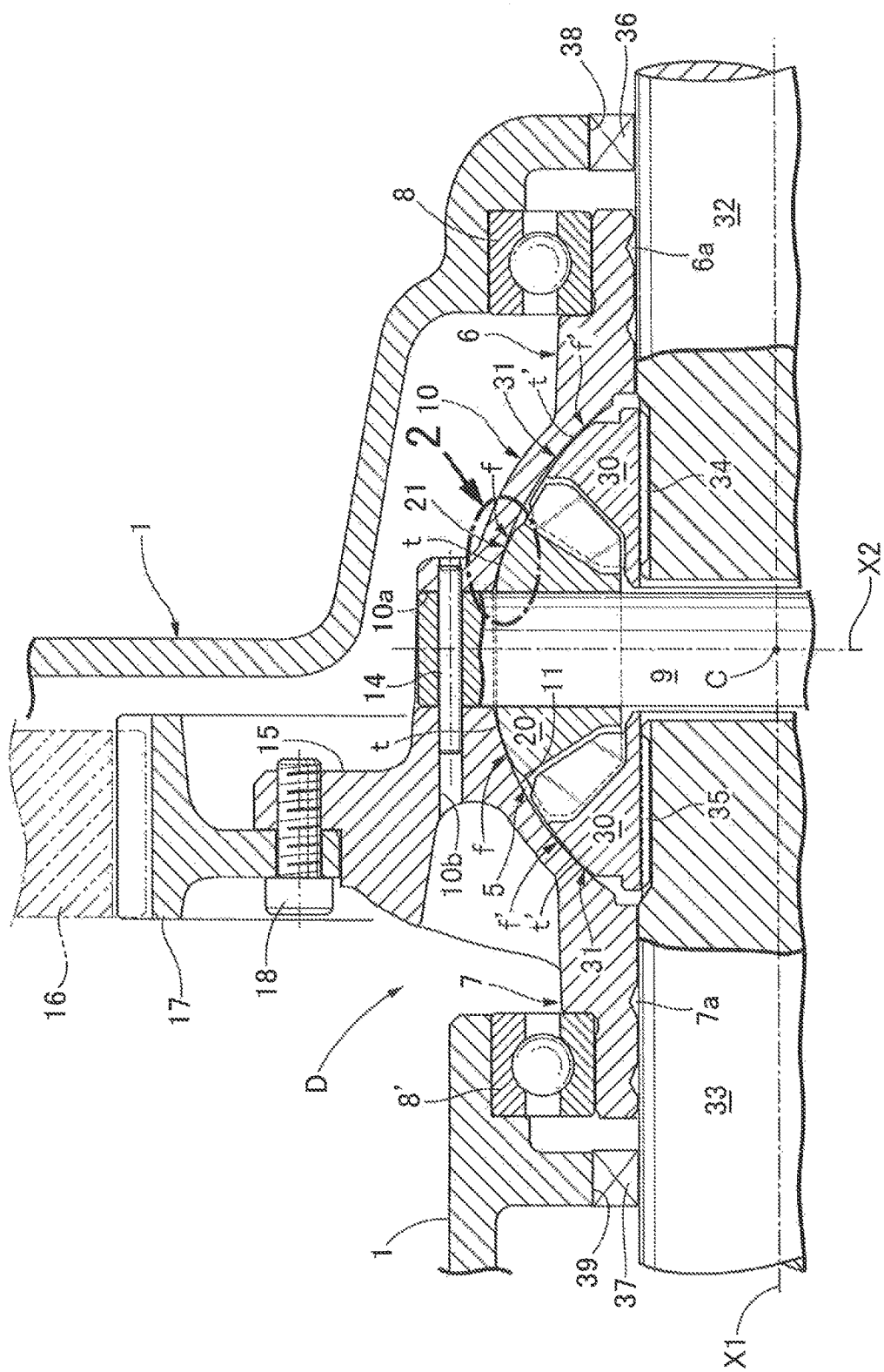
FIG. 1 is a sectional view of an essential part of a differential device related to a first embodiment of the present invention.
Figure 2:
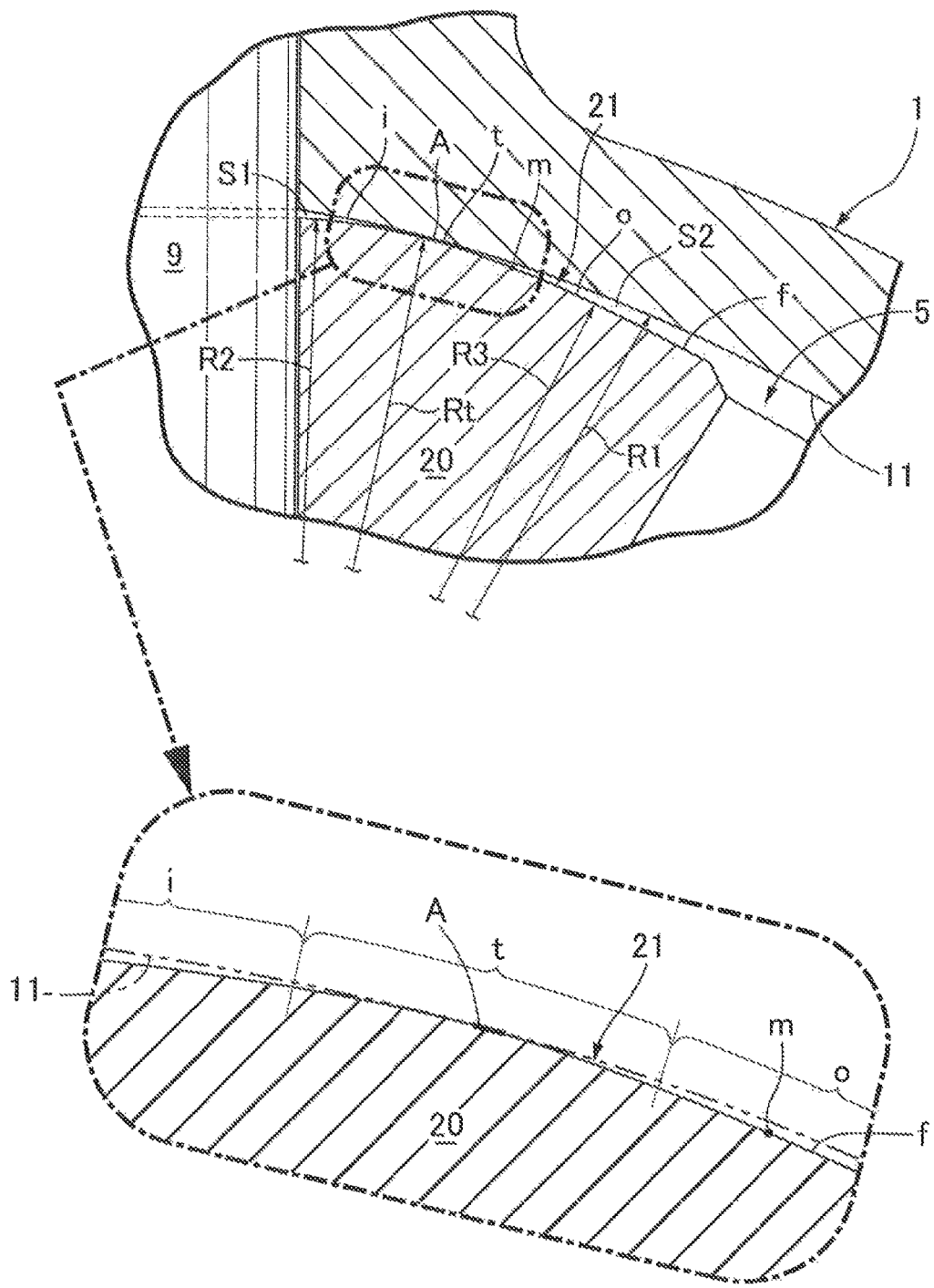
FIG. 2 is a sectional view (enlarged sectional view of part shown by arrow 2 in FIG. 1) and a partially enlarged sectional view showing an essential part of a back face support structure of a pinion gear of the differential device.

A first embodiment of the present invention shown in FIG. 1 and FIG. 2 is now explained. In FIG. 1, a differential device D is housed within a transmission case 1 of an automobile. This differential device D is formed from an integrated differential case 10 and a differential gear mechanism 5 incorporated into the differential case 10. Formed integrally with a right part and a left part of the differential case 10 are a first bearing boss 6 and a second bearing boss 7 arranged with a gap between each other on a first axis X1, which is a rotational axis of the differential case 10. The differential case 10 is rotatably supported on the transmission case 1 via bearings 8 and 8' on the first and second bearing bosses 6 and 7.

Furthermore, an annular flange 15 is formed integrally with an intermediate part of the differential case 10 that is offset from a center C toward the second bearing boss 7 side, and a ring gear 17 meshing with an output gear 16 of a transmission device connected to a power source is fastened by means of a bolt 18 to the flange 15. Instead of such bolt fastening, joining by welding can be employed or the ring gear may be formed integrally with the differential case 10.

The differential gear mechanism 5 includes a pinion shaft 9 that is retained on the differential case 10 so as to be present on a second axis X2 orthogonal to the first axis X1 and go through the center C of the differential case 10, a pair of pinion gears 20 that are supported on the pinion shaft 9 so that they can rotate around the second axis X2, and a pair of side gears 30 that are disposed so as to sandwich the pinion gears 20 and mesh with the pinion gears 20. All of the pinion gears 20 and the side gears 30 are formed from bevel gears and are incorporated into the differential case 10 together with the pinion shaft 9.

The pinion shaft 9 is fitted into a pair of support holes 10a provided in a peripheral wall of the differential case 10 so that the pinion shaft 9 can be removed from either end. Press fitting a retaining pin 14 extending through one end part of the pinion shaft 9 into a mounting hole 10b provided in the differential case 10 so as to intersect one of the support holes 10a fixes the pinion shaft 9 to the differential case 10. As fixing means, fixing means (e.g. welding, screwing, etc.) other than press fitting can be employed.

The pair of side gears 30 are supported on the differential case 10 via first and second drive shafts 32 and 33 fittingly inserted into and supported on the first and second bearing bosses 6 and 7 of the differential case 10 so that the side gears 30 can rotate around the first axis X1. That is, the outer periphery of intermediate parts of the first and second drive shafts 32 and 33 is fittingly inserted into and rotatably supported on inner peripheral parts of the first and second bearing bosses 6 and 7, and the outer periphery of inner end parts of the first and second drive shafts 32 and 33 is fitted into inner peripheral parts of the pair of side gears 30 by means of spline fittings 34 and 35.

The first and second drive shafts 32 and 33 are inserted into the transmission case 1 through a pair of through holes 38 and 39 provided in the transmission case 1, and annular seal members 36 and 37 are disposed between inner faces of the through holes 38 and 39 and the first and second drive shafts 32 and 33 so as to seal a gap therebetween. Helical lubrication grooves 6a and 7a are formed in at least one of mating faces of the first and second bearing bosses 6 and 7 and the first and second drive shafts 32 and 33 (inner peripheral faces of the first and second bearing bosses 6 and 7 in this embodiment), the lubrication grooves 6a and 7a enabling lubricating oil within the transmission case 1 to be drawn into them accompanying relative rotation between one and the other of the mating faces.

In this embodiment, the pair of side gears 30 are rotatably supported on the differential case 10 via the first and second drive shafts 32 and 33. However, for example, bosses projectingly provided on back faces of the pair of side gears 30 may be rotatably fitted into and supported directly on the differential case 10 (that is, without using the drive shafts 32 and 33).

A rotational driving force from the power source that has been inputted into the differential case 10 is transmitted to the pair of side gears 30 via the pinion shaft 9 and the pinion gear 20 and further to the first and second drive shafts 32 and 33. This enables the drive shafts 32 and 33 to be rotated while allowing differential rotation.

An inner face of the differential case 10 forms a spherically shaped concave support face 11 having the center C of the differential case 10 as a center. Each of back faces 21 and 31 of the pinion gear 20 and the side gear 30 rotatably and slidably abuts against and is supported on the support face 11.

The back face 21 of the pinion gear 20 is formed as a convexly curved face f in which, as shown in FIG. 2, when viewed in any cross section containing the entire second axis X2, the greater part on opposite sides of the second axis X2 has a fixed cross sectional shape that is curved so as to protrude toward the support face 11 side and is high in the middle (that is, is substantially arc-shaped). The convexly curved face f of this embodiment is set so that a radius of curvature Rt of an apex part t is smaller than radii of curvature R2 and R3 of an inside curved face part i and an outside curved face part o, which are smoothly continuous with opposite sides of the apex part t.

With regard to the convexly curved face f, although in this embodiment the radius of curvature Rt of the apex part t is different from the radii of curvature R2 and R3 of the inside curved face part i and the outside curved face part o, in the present invention the radius of curvature of the entire convexly curved face f including the apex part t may be set to be the same for all sections (that is, Rt).

In this embodiment, the radius of curvature Rt of the apex part t is set smaller than a radius of curvature R1 of the support face 11 so that the back face 21 of the pinion gear 20 is supported on the support face 11 only at the apex part t of the convexly curved face f. Moreover, the apex part t is positioned close to the second axis X2, that is, is disposed offset further toward the second axis X2 side than a midpoint m of the convexly curved face f.

On the other hand, the back face 31 of the side gear 30 is formed as a convexly curved face f' in which when viewed in any cross section containing the entire first axis X1, the greater part on opposite sides of the first axis X1 has a fixed cross sectional shape that is curved so as to protrude toward the support face 11 side and is high in the middle (that is, is substantially arc-shaped). The shape of the convexly curved face f' of the back face 31 of the side gear 30 is substantially the same as the shape of the convexly curved face f of the back face 21 of the pinion gear 20 described above. That is, the radius of curvature of the apex part t' is set smaller than the radius of curvature R1 of the support face 11 when viewed in a cross section containing the entire first axis X1 so that the back face 31 of the side gear 30 is supported on the support face 11 via the apex part t' of the convexly curved face f'. Moreover, the apex part t' is disposed offset further toward the first axis X1 side than a midpoint of the convexly curved face f'.

The peripheral wall of the differential case 10 is provided with a pair of access windows (not illustrated) that allow the work of machining the spherically shaped support face 11 of the differential case 10 and the work of incorporating the differential gear mechanism 5 into the differential case 10 to be carried out.

The operation of the first embodiment is now explained. When assembling the differential device D, first, the side gear 30 and the pinion gear 20 are inserted into the differential case 10 in sequence through the access window. Subsequently, the pinion shaft 9 is fittingly inserted into the pinion gear 20 and the support hole 10a of the differential case 10, and the pinion shaft 9 is then fixed to the differential case 10 by means of the retaining pin 14.

The differential device D thus assembled is incorporated into the transmission case 1, the first and second drive shafts 32 and 33 are then inserted into the transmission case 1 through the through holes 38 and 39 of the transmission case 1, the inner end parts of the two drive shafts 32 and 33 are fitted into the inner peripheral parts of the pair of side gears 30 by means of the spline fittings 34 and 35, and the gaps between the inner faces of the through holes 38 and 39 and the first and second drive shafts 32 and 33 are sealed with the annular seal members 36 and 37.

Following this, when lubricating oil is poured into the transmission case 1, some of it flows into the interior of the differential case 10 through the access window and is used in the lubrication of each part (e.g. meshing parts between the pinion gear 20 and the side gear 30, rotationally sliding parts between the support face 11 and the back faces 21 and 31 of the pinion gear 20 and the side gear 30, etc.) of the differential gear mechanism 5.

As is clear from FIG. 1 and FIG. 2, the back face 21 of the pinion gear 20 of this embodiment is formed as the convexly curved face f, which is curved so that the portions on opposite sides of the second axis X2 each protrude toward the support face 11 side of the differential case 10 and the middle is high when viewed in a cross section containing the entire second axis X2, and the radius of curvature Rt of the apex part t is set smaller than the radius of curvature R1 of the support face 11 so that the back face 21 of the pinion gear 20 is supported on the support face 11 via the apex part t of the convexly curved face f. This restricts the region of contact between the support face 11 and the back face 21 of the pinion gear 20 to an annular contact part A between the apex part t and the support face 11, thus enabling oil retaining spaces S1 and S2 to be ensured over a wide range between opposing faces of the support face 11 and the back face 21 around the contact part A and thereby enabling sufficient lubricating oil to be retained there.

As a result, it becomes possible to reduce the rotational sliding resistance that the pinion gear 20 is subjected to from the support face 11 by means of a simple structure in which the back face 21 of the pinion gear 20 is merely made as the convexly curved face f, thereby enhancing the transmission efficiency of the differential device D while reducing the cost.

Moreover, in this embodiment, since the apex part t of the convexly curved face f on the back face 21 of the pinion gear 20 is disposed offset further toward the second axis X2 side than the midpoint m of the convexly curved face f, the radial distance from the rotational center (that is, the second axis X2) of the pinion gear 20 up to the contact part A between the apex part t and the support face 11 can be made relatively short. This enables the peripheral speed of the contact part A when the pinion gear 20 is rotating to be reduced, thus enabling wear of the contact part A to be suppressed effectively.

On the other hand, the back face 31 of the side gear 30 is formed as the convexly curved face f', which is curved so that the greater part on opposite sides of the first axis X1 protrudes toward the support face 11 side and is high in the middle when viewed in a cross section containing the entire first axis X1. The shape of the convexly curved face f' is the same as the shape of the convexly curved face f of the back face 21 of the pinion gear 20 described above. Because of this, the same operational effect as the operational effect based on the original shape of the convexly curved face f of the back face 21 of the pinion gear 20 can be achieved by the convexly curved face f' of the back face 31 of the side gear 30.

Figure 3A:
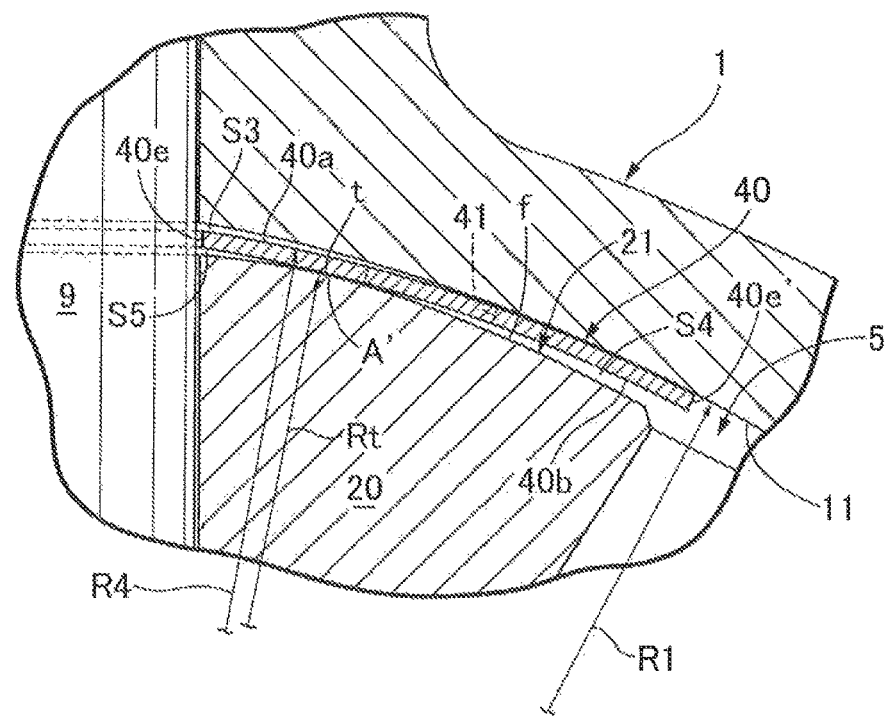
FIGS. 3A and 3B are sectional views (corresponding to FIG. 2) each showing an essential part of a back face support structure of a pinion gear in a differential device related to a second embodiment of the present invention, FIG. 3A showing a state when there is a small thrust load and FIG. 3B showing a state when the thrust load is large and a thrust washer is sufficiently elastically deformed.
Figure 3B:
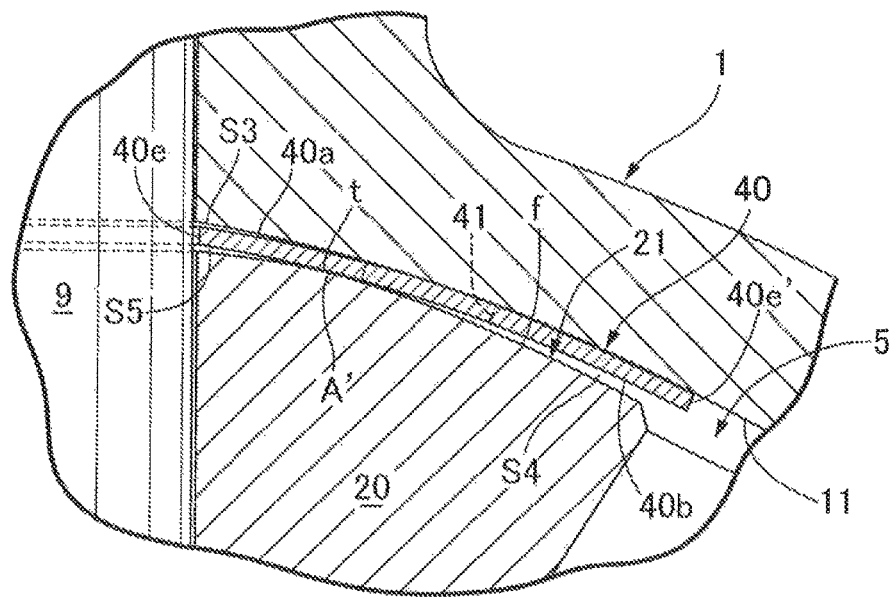
Figure 4:
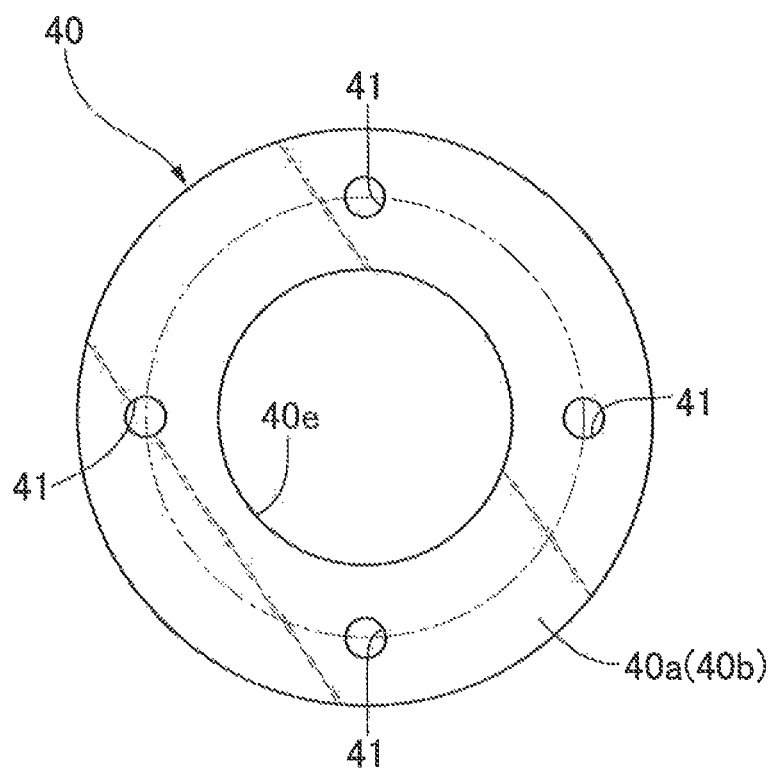
FIG. 4 is a front view showing the thrust washer on its own related to the second embodiment.

A second embodiment of the present invention is shown in FIGS. 3A and 3B and FIG. 4.

In the second embodiment, the shape of the back face 21 (the convexly curved face f) of the pinion gear 20 is the same as that of the first embodiment, and an elastically deformable annular thrust washer 40 formed as a spherical plate shape that is curved so as to be convex toward the support face 11 side is disposed between the support face 11 of the differential case 10 and the back face 21 (that is, the convexly curved face f) of the pinion gear 20. An outside face 40a of the thrust washer 40 that opposes the support face 11 is formed as a convex spherical surface having a radius of curvature R4 that is larger than the radius of curvature R1 of the support face 11 when viewed in a cross section containing the entire second axis X2 (see FIGS. 3A and 3B).

Furthermore, an inside face 40b of the thrust washer 40 that is on the side opposite to the support face 11 is formed as a spherical face having the same or substantially the same radius of curvature as that of the outside face 40a. Therefore, the radius of curvature Rt of the apex part t of the back face 21 (that is, the convexly curved face f) of the pinion gear 20 is smaller than the radius of curvature of the inside face 40b of the thrust washer 40, with which the apex part t is in contact.

The back face 21 of the pinion gear 20 contacts the inside face 40b of the thrust washer 40 only via the apex part t of the back face 21. Thereby, with regard to the back face 21 of the pinion gear 20, the apex part t is rotatably and slidably supported on the support face 11 via the thrust washer 40.

A plurality of through holes 41 are provided in the thrust washer 40 at intervals in the peripheral direction on the side that is further from the second axis X2 than a contact part A' via which the inside face 40b of the thrust washer 40 contacts the apex part t of the back face 21 of the pinion gear 20.

The arrangement of the second embodiment is otherwise the same as that of the first embodiment, and in FIGS. 3A and 3B parts corresponding to those of the first embodiment are denoted by the same reference numerals and symbols, duplication of the explanation being omitted.

In the second embodiment, basically the same effects as those of the first embodiment can also be achieved and, furthermore, in accordance with the second embodiment, based on the points that the thrust washer 40 whose outside face 40a is a spherical shape that is convex toward the support face 11 side is disposed between the support face 11 of the differential case 10 and the back face 21 of the pinion gear 20 and the radius of curvature R4 of the outside face 40a is set larger than the radius of curvature R1 of the support face 11, the following specific effects are achieved.

That is, when the thrust load of the pinion gear 20 is relatively small, the thrust washer 40 is in a state in which the amount of elastic deformation is zero or in a state in which it is very small. In this case, as shown in FIG. 3A an outer peripheral part of the outside face 40a of the thrust washer 40 is in intimate contact with the support face 11, whereas a relatively large gap S3 is formed between the inner peripheral part of the outside face 40a and the support face 11, and due to the inside face 40b of the thrust washer 40 making contact with the apex part t of the back face 21 of the pinion gear 20, some gaps S4 and S5 are also present between an outer peripheral part and an inner peripheral part respectively of the inside face 40b and the back face 21 of the pinion gear 20. Therefore, since lubricating oil can be retained sufficiently by these three gaps S3 to S5, the effect in lubricating the parts where the thrust washer 40 and the support face 11 and back face 21 are in contact can be enhanced.

A case in which due to an increase in the thrust load of the pinion gear 20, the thrust washer 40 is considerably elastically deformed by being pushed strongly by the apex part t of the back face 21 of the pinion gear 20 is shown in FIG. 3B. In this case, although the gap S3 between the support face 11 and the inner peripheral part of the outside face 40a of the thrust washer 40 is reduced a little, the three gaps S3 to S5 are still ensured, lubricating oil can be continuously retained by each of the gaps S3 to S5, and the lubricating effect can be maintained. Furthermore, since a situation in which galling is caused by an inner peripheral edge 40e of the thrust washer 40 biting into the support face 11 or the back face 21 or an outer peripheral edge 40e' biting into the back face 21 can be avoided as far as possible, it is possible to contribute to suppression of wear of the support face 11 and the back face 21 and consequently improvement of durability.

Moreover, since the thrust washer 40 has the plurality of through holes 41 on the side further from the second axis X2 than the contact part A' with the apex part t of the back face 21 of the pinion gear 20, even if due to an increase in the thrust load of the pinion gear 20 the thrust washer 40 is pushed strongly by the apex part t of the back face 21 of the pinion gear 20, and the outer peripheral part of the outside face 40a of the thrust washer 40 comes into wide intimate contact with the support face 11, it is possible to efficiently supply lubricating oil to the intimate contact part through the through hole 41 in the outer peripheral part of the inside face 40b of the thrust washer 40, thus keeping the intimate contact part in a well lubricated state.

The through hole 41 can be omitted when a good lubricating effect can be anticipated without the through hole 41.

Furthermore, a thrust washer (not illustrated) having the same shape and structure as the thrust washer 40 described above is disposed as necessary between the back face 31 (that is, the convexly curved face f') of the side gear 30 and the support face 11. In this case, the same operational effects as the operational effects based on the convexly curved face f of the back face 21 of the pinion gear 20 and the thrust washer 40 being specially provided can be achieved by the back face support structure of the side gear 30.

Embodiments of the present invention are explained above, but the present invention is not limited to the above-mentioned embodiments and may be modified in a variety of ways as long as the modifications do not depart from the gist of the present invention.

For example, in the above embodiments, a case in which the present invention is applied to both the back face support structure of the pinion gear 20 and the back face support structure of the side gear 30 of the differential device D is shown, but the present invention may be applied only to the back face support structure of either one of the pinion gear 20 and the side gear 30.

In the above embodiments, the differential device D is housed within the automobile transmission case 1, but the differential device D is not limited to a differential device for an automobile and can be put into practice as a differential device for various types of mechanical devices.

Furthermore, the present invention can be applied to a transmission other than a differential device in which a back face of a rotating member is rotatably and slidably supported on a spherical support face of a support body.

Moreover, in the above embodiments, the differential device D is applied to a left and right wheel transmission system and power is distributed between left and right drive shafts while allowing differential rotation, but in the present invention the differential device may be applied to a front and rear wheel transmission system in a front and rear wheel driven vehicle, and power may be distributed between front and rear driven wheels while allowing differential rotation.

Furthermore, in the above embodiments, the pair of pinion gears 20 are rotatably supported on the differential case 10 via the single pinion shaft 9, which is a separate member from the pinion gear 20, but three or more pinion gears 20 may be rotatably supported on a differential case via a pinion shaft extending radially from a center part of the differential case, or a pinion gear may be formed integrally with a pinion shaft part and the pinion shaft part may be rotatably supported on a differential case.

Moreover, in the above embodiments, the integrated differential case 10 with an access window is illustrated as a differential case as a support body, but in the present invention a differential case as a support body may be formed in a divided manner from a plurality of case elements (e.g. first and second case half bodies) fastened to each other by fastening means such as a bolt and the like.

What is claimed is:

1. A support structure for a rotating member, in which a support body supporting a rotating member so as to be rotatable around a predetermined axis is provided with a spherical support face that is recessed toward a side opposite to the rotating member, and a back face of the rotating member is rotatably and slidably supported on the support face,
    wherein the back face of the rotating member is formed as a convexly curved face that is curved so that portions on opposite sides of the predetermined axis each protrude toward the support face when viewed in a cross section containing an entirety of the predetermined axis, and in order for the back face to be supported on the support face via an apex portion of the convexly curved face, a radius of curvature of at least the apex portion is set smaller than a radius of curvature of the support face when viewed in the cross section, and
    wherein the apex portion is disposed offset further toward the predetermined axis than a midpoint of the convexly curved face in a radial direction of the predetermined axis when viewed in the cross section.

2. The support structure for a rotating member according to claim 1, wherein a thrust washer having an outside face with a spherical shape that is convex toward the support face side is disposed between the support face and the back face, and the outside face of the thrust washer is formed so as to have a radius of curvature that is larger than the radius of curvature of the support face when viewed in the cross section.

3. The support structure for a rotating member according to claim 2, wherein the thrust washer has a through hole on a side that is further from the predetermined axis than a site at which an inside face of the thrust washer contacts the apex portion.

4. The support structure for a rotating member according to claim 3, wherein the support body is a differential case, the predetermined axis comprises a first rotational axis and a second rotational axis, and the rotating member is at least one bevel gear among a pair of first bevel gears that are supported so as to be rotatable around the first rotational axis of the differential case and a second bevel gear that is present between the pair of first bevel gears, meshes with the pair of first bevel gears, and is supported on the differential case so as to be rotatable around the second rotational axis orthogonal to the first rotational axis.

5. The support structure for a rotating member according to claim 2, wherein the support body is a differential case, the predetermined axis comprises a first rotational axis and a second rotational axis, and the rotating member is at least one bevel gear among a pair of first bevel gears that are supported so as to be rotatable around the first rotational axis of the differential case and a second bevel gear that is present between the pair of first bevel gears, meshes with the pair of first bevel gears, and is supported on the differential case so as to be rotatable around the second rotational axis orthogonal to the first rotational axis.

6. The support structure for a rotating member according to claim 1, wherein the support body is a differential case, the predetermined axis comprises a first rotational axis and a second rotational axis, and the rotating member is at least one bevel gear among a pair of first bevel gears that are supported so as to be rotatable around the first rotational axis of the differential case and a second bevel gear that is present between the pair of first bevel gears, meshes with the pair of first bevel gears, and is supported on the differential case so as to be rotatable around the second rotational axis orthogonal to the first rotational axis.

7. A support structure for a rotating member, in which a support body supporting a rotating member so as to be rotatable around a predetermined axis is provided with a spherical support face that is recessed toward a side opposite to the rotating member, and a back face of the rotating member is rotatably and slidably supported on the support face,
wherein the back face of the rotating member is formed as a convexly curved face that is curved so that portions on opposite sides of the predetermined axis each protrude toward the support face when viewed in a cross section containing an entirety of the predetermined axis, and in order for the back face to be supported on the support face via an apex portion of the convexly curved face, a radius of curvature of at least the apex portion is set smaller than a radius of curvature of the support face when viewed in the cross section, and
wherein a thrust washer having an outside face with a spherical shape that is convex toward the support face side is disposed between the support face and the back face, and the outside face of the thrust washer is formed so as to have a radius of curvature that is larger than the radius of curvature of the support face when viewed in the cross section.

8. The support structure for a rotating member according to claim 7, wherein the thrust washer has a through hole on a side that is further from the predetermined axis than a site at which an inside face of the thrust washer contacts the apex portion.

9. The support structure for a rotating member according to claim 8, wherein the support body is a differential case, the predetermined axis comprises a first rotational axis and a second rotational axis, and the rotating member is at least one bevel gear among a pair of first bevel gears that are supported so as to be rotatable around the first rotational axis of the differential case and a second bevel gear that is present between the pair of first bevel gears, meshes with the pair of first bevel gears, and is supported on the differential case so as to be rotatable around the second rotational axis orthogonal to the first rotational axis.

10. The support structure for a rotating member according to claim 7, wherein the support body is a differential case, the predetermined axis comprises a first rotational axis and a second rotational axis, and the rotating member is at least one bevel gear among a pair of first bevel gears that are supported so as to be rotatable around the first rotational axis of the differential case and a second bevel gear that is present between the pair of first bevel gears, meshes with the pair of first bevel gears, and is supported on the differential case so as to be rotatable around the second rotational axis orthogonal to the first rotational axis.

* * * * *